(12) United States Patent
Aaron

(10) Patent No.: US 7,549,162 B2
(45) Date of Patent: Jun. 16, 2009

(54) METHODS OF PROVIDING SECURITY FOR DATA DISTRIBUTIONS IN A DATA NETWORK AND RELATED DEVICES, NETWORKS, AND COMPUTER PROGRAM PRODUCTS

(75) Inventor: Jeffrey Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 954 days.

(21) Appl. No.: 11/005,638

(22) Filed: Dec. 6, 2004

(65) Prior Publication Data

US 2006/0123482 A1  Jun. 8, 2006

(51) Int. Cl.
*H04L 29/06* (2006.01)
(52) U.S. Cl. .......................................... 726/12; 726/23
(58) Field of Classification Search ........................ None
See application file for complete search history.

(56) References Cited

U.S. PATENT DOCUMENTS

| | | | |
|---|---|---|---|
| 6,304,973 B1 * | 10/2001 | Williams | ........................ 726/3 |
| 6,370,648 B1 | 4/2002 | Diep | |
| 6,405,318 B1 | 6/2002 | Rowland | |
| 6,775,657 B1 | 8/2004 | Baker | |
| 6,785,821 B1 | 8/2004 | Teal | |
| 6,792,546 B1 | 9/2004 | Shanklin et al. | |
| 7,225,468 B2 * | 5/2007 | Waisman et al. | ............... 726/23 |
| 7,272,719 B2 * | 9/2007 | Bleckmann et al. | ......... 713/176 |
| 7,418,733 B2 * | 8/2008 | Connary et al. | ............... 726/25 |

OTHER PUBLICATIONS

Dasgupta et al., "An Intelligent Decision Support System for Intrusion Detection and Response", 2001, Retrieved from the Internet on Sep. 13, 2008: <URL: http://www.springerlink.com/content/wkjkmh8lpblduren/fulltext.pdf>.*

* cited by examiner

*Primary Examiner*—Benjamin E Lanier
*Assistant Examiner*—Minh Dinh
(74) *Attorney, Agent, or Firm*—Myers Bigel Sibley & Sajovec, P.A.

(57) ABSTRACT

Methods of operating a data network including a first network device and a second network device may be provided. In particular, data for distribution from the first network device to the second network device, a first risk factor associated with the data, and a second risk factor associated with the second network device may be provided. A risk of distribution may be assessed based on consideration of the first and second risk factors, and the distribution of data to the second network device may be blocked if the risk of distribution exceeds a threshold. Related systems, devices, and computer program products are also discussed.

13 Claims, 2 Drawing Sheets

METHODS OF PROVIDING SECURITY FOR DATA DISTRIBUTIONS IN A DATA NETWORK AND RELATED DEVICES, NETWORKS, AND COMPUTER PROGRAM PRODUCTS

FIELD OF THE INVENTION

The present invention relates to the filed of data networking, and more particularly, to methods of providing security for data networks and related networks and devices.

BACKGROUND OF THE INVENTION

Computer network security has been an important issue for all types of organizations and corporations for many years. Computer break-ins and misuse have become common. Numbers, as well as sophistication, of attacks on computer systems are also on the rise. Network intruders have overcome password authentication mechanisms designed to protect the system. With an increased understanding of how systems work, intruders have become skilled at determining system weaknesses and exploiting them to obtain unauthorized access. Intruders also use patterns of intrusion that may be difficult to trace and/or identify. Intruders may use several levels of indirection before breaking into target systems and rarely indulge in sudden bursts of suspicious or anomalous activity. If an account on a target system is compromised, intruders may carefully cover their tracks as not to arouse suspicion. Furthermore, threats like viruses and worms may not need human supervision and may be capable of replicating and traveling to connected computer systems. Unleashed at one computer in a network, it may be difficult to trace their origin or the extent of infection by the time they are discovered.

Firewalls are one approach to reducing unauthorized access. Essentially, a firewall is a control layer inserted between an enterprise's computer network and the outside. A firewall may permit only some traffic to pass through. The firewall may be configured by the administrator of the local network based on the enterprise's security policy. For example, a firewall may block traffic of a certain type, traffic from certain addresses, or traffic from all but a predetermined set of addresses.

Intrusion detection has been developed to extend security visibility into a computer network and monitor the activity of users while they are on the network. An Intrusion Detection System/Service (IDS) can augment an end-to-end security solution as a dynamic security component by detecting, responding to, and reporting unauthorized activity from data derived from the computer network.

Network intrusion detection is a process that can identify and respond to misuse or policy violations on a network. By placing sensing enabled (i.e. intrusion monitoring) devices at determined points on a network, network traffic can be monitored and compared against patterns or "signatures" that represent suspicious activity, misuse, or actual attacks. These devices can send alerts to the security management system and, under appropriate circumstances, send commands directly to network equipment such as routers and firewalls, reconfiguring them to deny access to the attacker. The system can automatically and quickly respond in a user-defined manner to send an alert or take immediate action.

Data network security is discussed, for example, in U.S. Pat. No. 6,792,546; U.S. Pat. No. 6,785,821; U.S. Pat. No. 6,775,675; U.S. Pat. No. 6,405,318; and U.S. Pat. No. 6,370, 648. The disclosure of each of these patents is hereby incorporated herein in its entirety by reference.

Notwithstanding the network security measures discussed above, there continues to exist a need in the art for improved security methods, devices, and networks.

SUMMARY

According to embodiments of the present invention, methods of operating a data network including a first network device and a second network device may be provided. In particular, data may be provided for distribution from the first network device to the second network device, and a first risk factor associated with the data and a second risk factor associated with the second network device may be provided. A risk of distribution may be assessed based on consideration of the first and second risk factors, and the distribution of data to the second network device may be blocked if the risk of distribution exceeds a threshold. If the risk of distribution does not exceed the threshold, the distribution of data to the second network device may be allowed.

The first risk factor may characterize a sensitivity of the data, and the second risk factor may characterize a degree of network intrusion associated with the second network device. Assessing the risk of distribution may include summing the first and second risk factors, and blocking the distribution of data may include blocking the distribution of data if the sum including the first and second risk factors exceeds the threshold. In an alternative, assessing the risk of distribution may include comparing the first and second risk factors.

In addition, a third risk factor associated with the first network device may be provided, and assessing the risk of distribution may include assessing the risk of distribution based on consideration of the first, second, and third risk factors. The first risk factor associated with the data may be based on at least one of a search for keywords included in the data, input from a creator of the data, a form of the data, a setting of the data, an owner of the data, and/or a classification of the data. The second risk factor associated with the second network device may be based on monitored network intrusions associated with the second network device.

Moreover, the first network device may be included in a first network zone including a first plurality of network devices, and the second network device may be included in a second network zone including a second plurality of network devices. In addition, monitoring unauthorized network intrusions of the second plurality of network devices in the second network zone may be monitored, and the second risk factor may be based on monitoring the unauthorized network intrusions of the second plurality of network devices in the second network zone. Moreover, a distribution of data may be allowed from the first network device to another network device in the first network zone without delay. In other words, a distribution of data between two network devices of a same network zone may be allowed without requiring consideration of risk factors associated with the data and/or the receiving network device.

According to additional embodiments of the present invention, a data network may include first and second network devices with each of the first and second network devices being configured to transmit and receive data, and a network gatekeeper may be coupled between the first and second network devices. The network gatekeeper may be configured to receive data from the first network device for distribution to the second network device, to assess a risk of distribution based on consideration of a first risk factor associated with the data and a second risk factor associated with the second network device, and to block the distribution of data to the second network device if the risk of distribution exceeds a threshold. The network gatekeeper may be further configured to allow the distribution of data to the second network device if the risk of distribution does not exceed the threshold.

The first risk factor may characterize a sensitivity of the data, and the second risk factor may characterize a degree of network intrusion associated with the second network device. Moreover, the network gatekeeper may be configured to assess the risk of distribution by summing the first and second risk factors, and the network gatekeeper may be configured to block the distribution of data if the sum including the first and second risk factors exceeds the threshold. In an alternative, the network gatekeeper may be configured to assess the risk of distribution by comparing the first and second risk factors.

The gatekeeper may be further configured to assess the risk of distribution based on consideration of the first and second risk factors and on a third risk factor associated with the first network device. The first risk factor associated with the data may be based on at least one of a search for keywords included in the data, input from a creator of the data, a form of the data, a setting of the data, an owner of the data, and/or a classification of the data. In alternative, the first risk factor may be provided from the first network device to the gatekeeper. The second risk factor associated with the second network device may be based on monitored network intrusions associated with the second network device.

In addition, the first network device may be one of a first plurality of network devices included in a first network zone, and the second network device may be one of a second plurality of network devices included in a second network zone. More particularly, an intrusion monitor may be configured to detect unauthorized network intrusions of the second plurality of network devices in the second network zone, wherein the second risk factor is based on the unauthorized network intrusions of the second plurality of network devices detected by the intrusion monitor. Moreover, the first network device may be configured to distribute data to another network device in the first network zone without delay.

According to yet additional embodiments of the present invention, a gatekeeper may be provided for a data network including first and second network devices. The gatekeeper may include a receiver configured to receive data for distribution from the first network device for distribution to the second network device, and a controller. The controller may be configured to assess a risk of distribution based on consideration of a first risk factor associated with the data and a second risk factor associated with the second network device. The controller may be further configured to block the distribution of the data to the second network device if the risk of distribution exceeds a threshold. Moreover, a transmitter may be configured to transmit the data to the second network device if the risk of distribution does not exceed the threshold.

The first risk factor may characterize a sensitivity of the data, and the second risk factor may characterize a degree of network intrusion associated with the second network device. In addition, the controller may be configured to assess the risk of distribution by summing the first and second risk factors, and the controller may be configured to block the distribution of data if the sum including the first and second risk factors exceeds the threshold. In an alternative, the controller may be configured to assess the risk of distribution by comparing the first and second risk factors.

The controller may be further configured to assess the risk of distribution based on consideration of the first and second risk factors and on a third risk factor associated with the first network device. Moreover, the first risk factor associated with the data may be based on at least one of a search for keywords included in the data, input from a creator of the data, a form of the data, a setting of the data, an owner of the data, and/or a classification of the data. In an alternative, the first risk factor may be received from the first network device.

The second risk factor associated with the second network device may be based on monitored network intrusions associated with the second network device. The first network device may be one of a first plurality of network devices included in a first network zone, and the second network device may be one of a second plurality of network devices included in a second network zone. Moreover, the second risk factor may be based detection of unauthorized network intrusions of the second plurality of network devices. In addition, the first network device may be configured to distribute data to another network device in the first network zone without delay.

According to still additional embodiments of the present invention, a computer program product may be provided for operating a data network, and the computer program product may include a computer readable storage medium having computer readable program code embodied therein. The computer readable program code may include computer readable program code configured to provide data for distribution from a first network device to a second network device, and computer readable program code configured to provide a first risk factor associated with the data. Computer readable program code may also be configured to provide a second risk factor associated with the second network device, and to assess a risk of distribution based on consideration of the first and second risk factors. Computer readable program code may also be configured to block the distribution of data to the second network device if the risk of distribution exceeds a threshold. In an alternative, computer readable program code may be configured to allow the distribution of data to the second network device if the risk of distribution does not exceed the threshold.

The first risk factor may characterize a sensitivity of the data, and the second risk factor may characterize a degree of network intrusion associated with the second network device. Moreover, assessing the risk of distribution may include summing the first and second risk factors, and blocking the distribution of data may include blocking the distribution of data if the sum including the first and second risk factors exceeds the threshold. In an alternative, assessing the risk of distribution may include comparing the first and second risk factors.

In addition, computer readable program code may be configured to provide a third risk factor associated with the first network device, and assessing the risk of distribution may include assessing the risk of distribution based on consideration of the first, second, and third risk factors. The first risk factor associated with the data may be based on at least one of a search for keywords included in the data, input from a creator of the data, a form of the data, a setting of the data, an owner of the data, and/or a classification of the data. The second risk factor associated with the second network device may be based on monitored network intrusions associated with the second network device.

Moreover, the first network device may be included in a first network zone including a first plurality of network devices, and the second network device may be included in a second network zone including a second plurality of network devices. More particularly, computer readable program code may be configured to monitor unauthorized network intrusions of the second plurality of network devices in the second network zone, and the second risk factor may be based on monitoring the unauthorized network intrusions of the second plurality of network devices in the second network zone. In addition, computer readable program code may be configured to allow a distribution of data from the first network device to another network device in the first network zone without delay.

Other systems, methods, devices, and/or computer program products according to embodiments of the invention will be or become apparent to one with skill in the art upon review of the following drawings and detailed description. It is intended that all such additional systems, methods, devices, and/or computer program products be included within this description, be within the scope of the present invention, and be protected by the accompanying claims.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-readable storage medium having computer-readable program code embodied in the medium for use by or in connection with an instruction execution system. In the context of this document, a computer-readable storage medium may be any medium that can store, the program for use by the instruction execution system, apparatus, or device.

The computer-readable medium may be, for example but not limited to, an electronic, magnetic, optical, electromagnetic, or semiconductor system, apparatus, device, or medium. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 1:
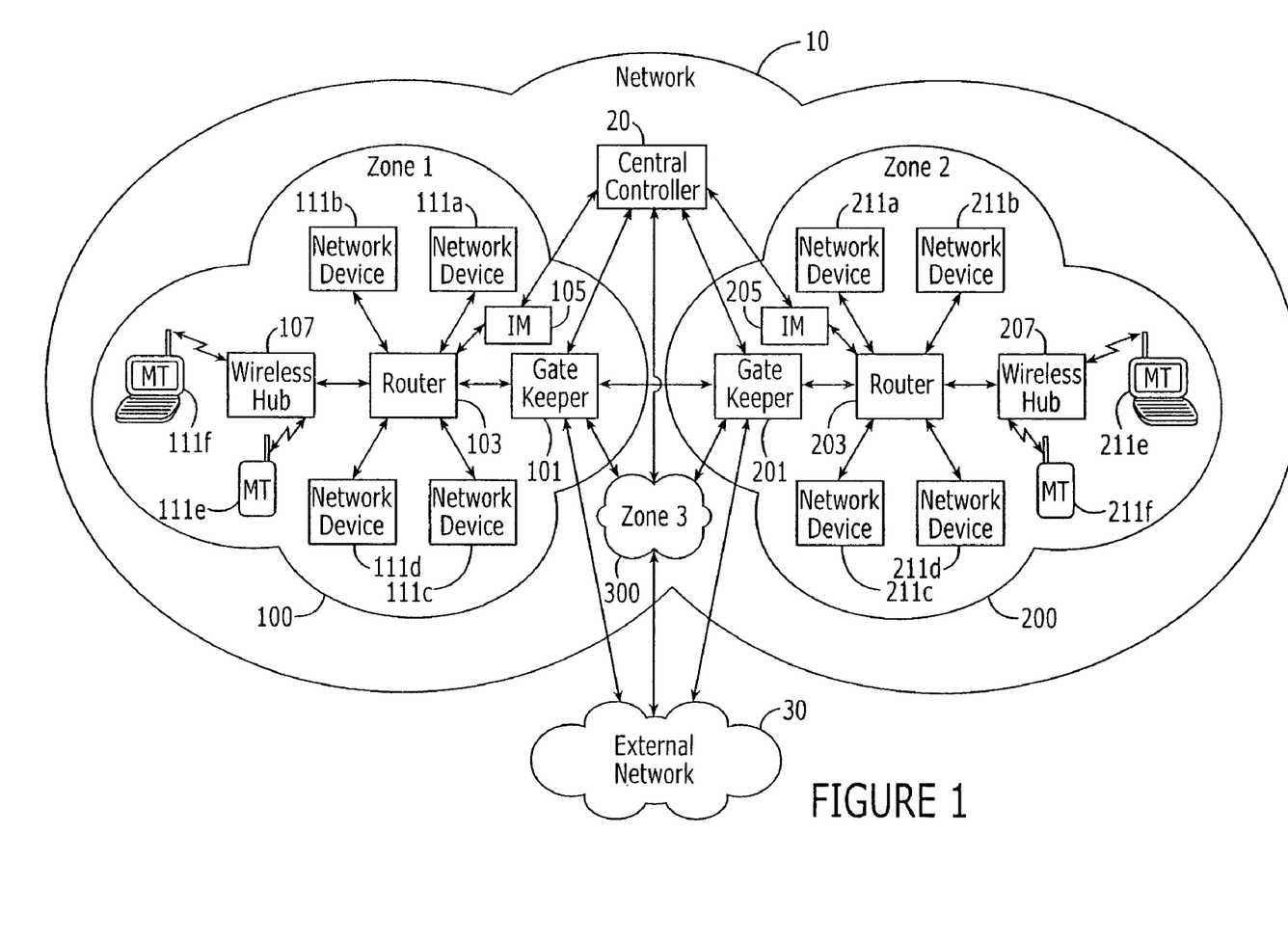
FIG. 1 is a block diagram illustrating data networks according to embodiments of the present invention.

As shown in FIG. 1, a data network 10 according to embodiments of the present invention may include zone1 100 and zone2 200, with data communications to and from each zone being provided through respective gatekeepers 101 and 103. A third network zone3 300 is shown by way of example without illustrating, individual elements thereof. While three network zones are illustrated by way of example, networks according to embodiments of the present invention may include any number of zones. Network zone 1100, for example, may include a router 103, a wireless hub 107, a plurality of network devices 111a-f, and an intrusion monitor 105. Similarly, zone2 200 may include a router 203, a wireless hub 207, a plurality of network devices 211a-f, and an intrusion monitor 205. Network zone3 300 may include elements similar to those discussed above with respect to Zone1 100 and Zone2 200. Moreover, a central controller 20 may be provided in the network to coordinate operations of elements of the different network zones and/or to implement and/or coordinate network security operations in cooperation with intrusion monitors and gatekeepers of the respective zones 100, 200, and 300. In addition, each of the zones 100, 200, and 300 may be coupled with an external network 30, such as the Internet.

Each network zone may provide networking for any number of network devices, such as desktop computers, handheld computers, notebook computers, laptop computers, mainframe computers, personal digital assistants (PDAs), radiotelephones, audio players/recorders, video players/recorders, cameras, etc. using wired and/or wireless connections. Network devices 111a-d and 211a-d, for example, may be desktop computers wired to the respective routers 103 and 203. The wireless hubs 107 and 207, for example, may provide wireless network connections for one or more mobile terminals 111e-f and 211e-f such as handheld computers, notebook computers, laptop computers, personal digital assistants (PDAs), and/or radiotelephones. The wireless hubs 107 and/or 207 may provide wireless connectivity, for example, using WiFi (IEEE 802.11), Bluetooth, and/or infrared connectivity.

In network zone1 100, for example, data distributions between any two or more of the network devices 111a-f may be provided through the router 103 without passing through the gatekeeper 101. Similarly, in network zone2 200, data distributions between any two or more of the network devices 211a-f may be provided through the router 203 without passing through the gatekeeper 101. A data distribution from any of the network devices 111a-f of zone1 100 to a network device of another zone of the network 10, however, is routed through the gatekeeper 101. Similarly, a data distribution from any of the network devices 211a-f of zone2 200 to a network device of another zone of the network 10 is routed through the gatekeeper 201. Accordingly, gatekeepers of the respective zones may be used to determine a risk of distributing data outside the network zone and to block distribution of data outside the network zone if a risk of distribution is too great.

While particular elements are illustrated in FIG. 1, it will be understood that functionalities of different elements illustrated in FIG. 1 may be shared in a same component. For example, functionalities of the gatekeeper 101 and the router 103 may be implemented as a same component. In an alternative, functionality of the wireless hubs may be implemented in the respective routers or eliminated from the respective network zones. In another alternative, a central gatekeeper component may embody functionalities of gatekeepers 101 and 201. In addition, functionality illustrated as a single element in FIG. 1 may be distributed. For example, functionality of the central controller 20 may be distributed within the different zones. More particularly, functionality of the central controller 20 may be distributed within the intrusion monitors, the gatekeepers, and/or the routers of the network zones. In an alternative, functionality of the different intrusion monitors may be implemented in the central controller 20. Moreover, additional functionality may be implemented beyond that specifically illustrated in the network 10 of FIG. 1. Firewalls may be provided in each of the zones, for example, within the respective gatekeepers, within the respective routers, and/or as separate components.

Each of zone1 100 and zone2 200 is illustrated by way of example with six network devices, one router, and one wireless hub. The different zones, however, may be implemented with different combinations of elements. Wireless hubs, for example, may be eliminated from one or both of the zones. Moreover, any of the zones may be implemented with a single network device, and a same number of elements and/or components is not required in different zones of the network 10. In addition, multiple routers, gatekeepers, wireless hubs, and/or intrusion monitors may be provided in one or more of the network zones.

The different zones of the network 10 may be provided for different departments of an organization, for different sets/collections of similar application servers or other device resources, for different levels of security, and/or for different geographic regions. By way of example, a first network zone may be provided for an engineering department, a second network zone may be provided for an accounting department, a third network zone may be provided for a marketing department, a fourth network zone may be provided for a legal department, a sixth network zone may be provided for a sales department, a seventh network zone may be provided for a research and development department, an eighth network zone may be provided for a human resources department, and/or an eighth network zone may be provided for a manufacturing department. Hierarchies of zones may also be employed. For example, the eighth (human resources) zone may be subdivided into additional zones or "sub-zones" based on geographical location and/or level of security provided in each sub-zone. According to embodiments of the present invention, distribution of data from one zone to another may be blocked if the receiving zone presents a sufficiently high risk with respect to the data being distributed.

Data for distribution within the network 10 may be proprietary and/or sensitive such that unauthorized access should be reduced. As used herein, the term data may refer to business data (such as letters, memos, spreadsheets, reports, tables, manuals, presentations, papers, etc.) or any other information (such as network administrative information, access lists and passwords, updated routing tables, etc.) Accordingly, an appropriate balance of security and openness should be provided such that data can be shared between network devices without undue risk of unauthorized access to sensitive data. If a particular network device has been compromised by a hacker, for example, the hacker may be able to access data at the compromised network device or at other network devices in the same network zone as the compromised network device. According to embodiments of the present invention, a distribution of sensitive data from network zone1 100 to the network zone2 200 may be blocked if a risk level associated with the network zone2 200 is sufficiently high based on detection of unauthorized intrusions of network devices of network zone2 200 by the intrusion monitor 205 and/or based on any other method of accessing the risk level associated with the network zone2 200, including for example, manual input of a risk level by security administrators/operators.

Embodiments of the present invention will now be discussed in the context of a desired distribution of data from network device 11a of network zone1 100 to network device 211a of network zone2 200. Client software on the sending network device 111a may define aspects of the data for distribution based on characteristics of the data, content of the data, and/or user input regarding the data. More particularly, aspects of the data may include: a setting of the data (i.e. personal, business, organization, etc.); a form of the data (i.e. e-mail, instant message, voice message, memo, letter, report, spreadsheet, database record, etc.); an owner of the data (i.e. an individual, a team, a group of teams, a division, an organization, etc.); a presence/absence in the data of keywords/phrases/strings associated with a general profile in which the sending network device is categorized; and/or a presence/absence in the data of keywords/phrases/strings applicable to a specific individual, customer, group, organization, etc.

Moreover, one or more of these aspects of the data may be used to define a risk factor associated with the data for distribution.

Defined aspects of the data for distribution may thus be derived based on automatic analysis of the data; based on a combination of automatic analysis of the data and user input; and/or based on user input. If defined aspects of the data are derived in whole or in part using automatic analysis, a user of the sending network device may override the automatically generated information and input a different defined aspects of the data. The risk factor associated with the data to be distributed, for example, may be determined based on a number of and/or types of defined aspects of the data. More particularly, the risk factor associated with the data for distribution may be generated as a score by summing points for the number and/or types of defined aspects of the data, and different thresholds for the total sum of points may be used to translate the sum of points into a risk factor.

Accordingly, defined aspects of the data for distribution may be used to determine a risk factor associated with the data for distribution. For example, the presence of one or more predefined keywords/phrases/segments in the data for distribution may result in an elevated risk for the data for distribution. In an alternative, a user of the sending network device may input a desired risk factor for the data for distribution. For example, a risk factor from zero (low risk) to five (high risk) may be assigned to the data for distribution. The risk factor may be provided with the data for distribution at the gatekeeper 101 where the pending distribution is delayed.

As discussed above, client software at the sending network device 111a may determine different aspects of the data and assign the risk factor for the data. In addition or in an alternative, one or both of these functions may be performed at the gatekeeper 101. For example, the gatekeeper 101 may assign a risk factor to the data for distribution based on automatic analysis of the data at the gatekeeper 101. In another example, client software at the sending network device may characterize the data for distribution and provide the characterization of the data to the gatekeeper 101 where a risk factor for the data can be determined.

The data for distribution (from network device 111a to network device 211a) and a risk factor associated with the data for distribution are thus provided at the gatekeeper 101, and the pending distribution of the data is delayed at the gatekeeper 101 before transmission to zone2 200. In addition, a risk factor associated with the network device 211a (such as a risk factor associated with network zone2 200 including network device 211a) is provided at the gatekeeper 101, and the gatekeeper 101 may determine a risk of distributing the data to the network device 211a based on consideration of the risk factor associated with the data and the risk factor associated with the receiving network device 211a. Accordingly, the pending distribution of data from network device 11a to network device 211a may be blocked if the risk of distribution exceeds a threshold. In the alternative, the pending distribution of data from network device 11a to network device 211a may be allowed if the risk of distribution does not exceed the threshold.

More particularly, intrusion monitor 205 of network zone2 200 may be configured to detect unauthorized intrusions into network devices of network zone2 200, and intrusion monitor 105 may be configured to detect unauthorized intrusions into network zone1 100. Each intrusion monitor may be configured to detect unauthorized intrusions such as hacking, probing, denial of service (DoS), viruses, worms, and/or other unauthorized activity within and/or associated with the respective network zone. Intrusion monitoring is discussed, for example, in U.S. Pat. No. 6,370,648, in U.S. Pat. No. 6,405,318, in U.S. Pat. No. 6,775,657 in U.S. Pat. No. 6,785,821, and in U.S. Pat. No. 6,792,546, and the disclosure of each of these patents is hereby incorporated herein in its entirety by reference. In addition or in an alternative, intrusion monitoring may be performed at individual network devices. For example, antivirus and/or host-based intrusion detection software at each network device of a network zone may provide information to the respective intrusion monitor for that network zone. Moreover, intrusion monitoring services/functions may be contracted out to a service provider other than an operator of the network 10.

Events of unauthorized intrusions into the network zone2 200 may be detected by intrusion monitor 205, and these detected events may be used to determine a risk factor associated with network devices of the network zone2 200. For example, events detected by the intrusion monitor 205 may be reported to the central controller 20, and the central controller 20 may assign/calculate the risk factor to be associated with network devices of network zone2 200. The risk factor, for example, may be determined based on a number of detected security events, numbers of detected security events within a period of time, types of detected security events, and/or sequences or other patterns of detected security events. More particularly, the risk factor for a network zone may be generated as a score by summing points for numbers of detected security events, numbers of detected security events within a period of time, types of detected security, events, and/or sequences or other patterns of detected security events, and different thresholds for the total sum of points may be used to translate the sum of points into a risk factor.

The risk factor associated with network devices of network zone2 200 may thus be assigned by the central controller 20 and provided to the gatekeeper 101, and the gatekeeper 101 can use the risk factor associated with the network devices of network zone2 200 to determine whether to block or allow the pending distribution from network device 11a to network device 211a. For example, a risk factor from one (low risk) to five (high risk) may be associated with a network device in a network zone.

The central controller 20 may receive information from intrusion monitors of each network zone of the network, and the central controller 20 may provide risk factors for the different network zones and/or devices to gatekeepers of the different network zones. Moreover, the risk factors for the different network zones and/or devices may be updated periodically and/or in response to a change in status. For example, the central controller 20 may calculate new risk factors for network zone1 100 and zone2 200 at set time intervals, and/or on receipt of additional information from a respective intrusion monitor. In addition, the central controller 20 may transmit risk factors to respective gatekeepers at set time intervals, responsive to a change of a risk factor, and/or responsive to a request from a gatekeeper. Moreover, each gatekeeper may receive risk factors for all network zones except in some cases for the network zone in which the gatekeeper resides, for example, when the gatekeeper zone is a different zone from the other zones and contains only the gatekeeper or gatekeepers.

In an alternative, the intrusion monitor 205 may assign the risk factor associated with network devices of network zone2 200, and the risk factor may be provided from intrusion monitor 205 to gatekeepers of other network zones (such as gatekeeper 101). In another alternative, the central controller 20 may both detect events of unauthorized intrusion in each of the network zones and assign the risk factors for each of the network zones. In another alternative, intrusion monitoring may be performed at individual network devices, and/or risk factors may be individually assigned to each of the network devices in a network zone. In still another alternative, risk factors may be individually assigned to particular network devices in a same network zone, and/or a single risk factor may be assigned to a group of network devices in a same network zone, and/or a single risk factor may be assigned to all network devices in a network zone.

As discussed above, the gatekeeper 101 is thus provided with a risk factor associated with the data for distribution and a risk factor associated with the receiving network device 211a to determine a risk of distribution of the data from network device 111a to network device 211a. The distribution of the data may thus be blocked if the risk of distribution exceeds an acceptable threshold. In the alternative, the distribution of the data may be allowed if the risk of distribution does not exceed the threshold.

For example, the risk factor associated with the data may be a number from 0 (low risk) to 5 (high risk); the risk factor associated with the receiving network device may be a number from 0 (low risk) to 5 (high risk); determining a risk of distribution may include summing the two risk factors and a threshold of 6, for example, may be used to determine whether to allow or block the distribution of data. In this example, the distribution of data may be blocked if the sum of the two risk factors exceeds the threshold of 6, and the distribution of data may be allowed in the sum of the two risk factors does not exceed the threshold. The risk factors may also be weighted prior to summing, and/or additional risk factors may be considered. For example, a risk factor associated with the sending network device and/or the sending network zone may also be used in the determination.

In an alternative, a comparison of the risk factors may be used to determine a risk of distribution. For example, a the risk factor associated with the data may be characterized as low or high, and the risk factor associated with the receiving network may be characterized as low, medium or high. In this example, distribution of low risk data may be allowed if the receiving network device is in a low and/or medium risk network zone, and blocked if the receiving network device is in a high risk network zone. Distribution of high risk data may be allowed if the receiving network device is in a low risk network zone, and blocked if the receiving network is in a medium or high risk network zone. More sophisticated metrics may be used to determine whether to allow or block a data distribution to another network zone, for example, using more granularity for the risk factors associated with the data and/or the receiving device, and/or using additional risk factors. For example, a risk factor for the data could be characterized as low, medium, or high, and/or a risk factor associated with the sending network device and/or network zone could be included in the decision metric. With additional levels of risk being used to characterize the data, for example, a sufficiently low risk for the data may allow the data to be distributed to another network zone irregardless of a risk for the receiving network device/zone, and/or a sufficiently high risk for the data may preclude distribution of the data to another network zone irregardless of a risk for the receiving network device/zone.

In the event that gatekeeper 101 blocks the distribution of the data from network device 11b to network device 211a, the gatekeeper 101 may provide a notification, an alert, and/or an alarm, and any such notifications, alerts, and/or alarms may be provided to the sending network device 111a, the receiving network device 211a, a network device of a third party (such as a supervisor and/or network administrator), and/or the central controller 20 where a log may be maintained. More particularly, the gatekeeper 101 may send a notification to the sending network device 111a in the event that the distribution of data is blocked to inform the sender that the distribution did not occur, and the notification may also be sent to the central controller 20. In addition or in an alternative, the gatekeeper 101 may send an alarm and/or an alert to the central controller.

The gatekeeper 101, for example, may send a notification of a blocked data distribution (between sending and receipting network devices 111a and 211a) to a third network device (such as a network device used by a supervisor of the user of the sending network device 111a). A supervisor may thus receive notification of the blocked data distribution, and the supervisor may override the blocking of the data distribution at the gatekeeper 101. For example, the notification may be sent by the gatekeeper 101 to a third network device 111d, and a supervisor using the third network device 111d may respond with an instruction to allow the distribution of data to the receiving network device 211a. Accordingly, the gatekeeper may not permanently block the data distribution, but instead, the gatekeeper may delay the data distribution until an overriding instruction is received from a supervisor. If an overriding instruction is not received from a supervisor within some period of time, the distribution of data may then be permanently blocked, and a notification may be sent to the sending network device 111a.

In an alternative, a notification of a blocked data distribution may be transmitted to the sending network device 111a, and a user of the sending network device 111a may have the option of overriding blocking at the gatekeeper 101. More particularly, multiple thresholds may be provided with respect to the risk of distribution. For example, a risk of distribution exceeding a first threshold may result in a blocking of the data distribution that can be overridden and notification to the sender, and the sender may override the temporary blocking. A risk of distribution exceeding a second threshold, however, may result in a permanent blocking of the data distribution that cannot be overridden.

As discussed above, each of the risk factors associated with the data for distribution and the receiving network device may be provided as numerical values such as from 0 (representing a lowest level of risk) to 5 (representing a highest level of risk), and the risk factors associated with the data and the receiving network device can be summed. The sum of the risk factors can then be compared to a plurality of thresholds to determine an appropriate course of action for the gatekeeper 101. In the example with each risk factor having a range of 0 to 5, the sum of the two risk factors will have a range of 0 to 10.

By way of example, if the sum of risk factors does not exceed a first threshold (such as 1), the distribution of data from the sending network device 111a to the receiving network device 211a may be allowed by the gatekeeper 101 without further delay. If the Sum of risk factors exceeds the first threshold but does not exceed a second threshold (such as 3), the sending network device 111a may be notified, and a user of the sending network device 111a may be allowed to authorize the data distribution after notification of the tentative block. If authorization from sending network device 111a is received at the gatekeeper 103, the distribution of data to the receiving network device 211a may be allowed to proceed. The notification to and/or response from the sending network device 111a may be provided, for example, using e-mail, interactive messaging, a telephone interaction system, and/or an interactive pager.

If the sum of risk factors exceeds the second threshold but does not exceed a third threshold (such as 5), the distribution of data may be blocked by the gatekeeper 101 pending a request for authorization from an appropriate individual (other than the user of the sending network device 111*a*) in the organization (such as a supervisor and/or network administrator). The request for authorization and/or the response may be provided, for example, using e-mail, interactive messaging, a telephone interaction system, and/or an interactive pager.

If the sum of risk factors exceeds the third threshold but does not exceed a fourth threshold (such as 7), the distribution of data may blocked by the gatekeeper 101, and a notification may be send to the central controller. If the sum of risk factors exceeds the fourth threshold but does not exceed a fifth threshold (such as 9), the distribution of data may be blocked by the gatekeeper 101, the notification may be sent to the central controller 20 and an alert may be sent to the attention of a human or other entity (such as an automated/semi-automated system) responsible for network security. If the sum of risk factors exceeds the fifth threshold, the distribution of data may be blocked by the gatekeeper 101, a notification may be sent to the central controller 20, an alert may be sent to the attention of a human or other entity responsible for network security, and an alarm may be generated (representing an escalation of an alert). In any of the situations where the distribution of data is blocked, a notification may be transmitted to the sending network device 111*a*.

As discussed above, data for distribution from a sending network device 111*a* to a receiving network device 211*a* may be blocked at/by gatekeeper 101 pending a determination of the risk of distribution at the gatekeeper 101. In an alternative, functionality discussed above with respect to the gatekeeper 101 may be implemented at the sending network device. For example, the sending network device may provide risk information regarding the data for distribution to the gatekeeper where risk analysis is performed without transmitting the actual data to the gatekeeper. The data can be maintained at the sending network device until the gatekeeper provides permission to proceed with the data distribution, and once permission for the data transfer is received, the sending network device can distribute the data to the receiving network device. Moreover, the gatekeeper may be outside a path of actual data distribution.

Figure 2:
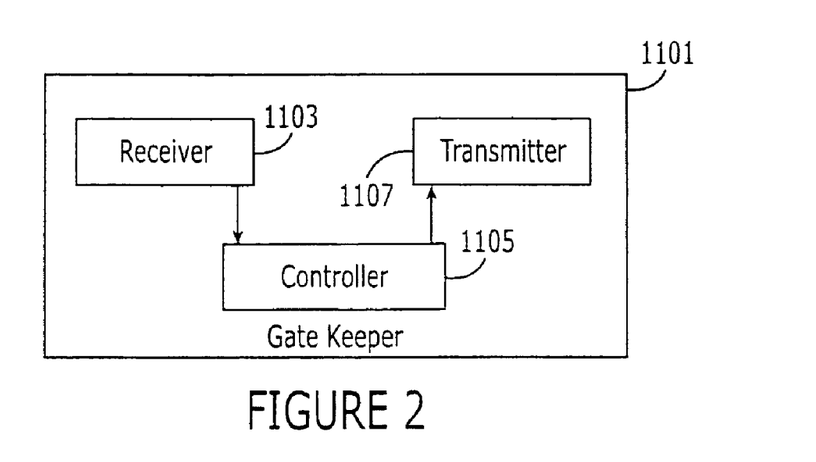
FIG. 2 is a block diagram illustrating gatekeepers according to embodiments of the present invention.

An example of a gatekeeper 1101 according to embodiments of the present invention is illustrated in FIG. 2. As discussed above, the gatekeeper 1101 may be provided between a sending network device and a receiving network device, and the sending and receiving network devices may be in different network zones. More particularly, the gatekeeper 1101 may include a receiver 1103, a controller 1105, and a transmitter 1107.

In the example of FIG. 1, the receiver 1103 may be configured to receive data from any of a plurality of network devices in the network zone including the receiver 1103 for distribution to one or more network devices in other network zones. The controller 1105 may be configured to determine a risk of distributing the data from the sending network device and to determine whether to distribute the data to another network zone. If the risk of distributing the data is too high, the controller 1105 may block the distribution. Otherwise, the transmitter 1107 may transmit the data to the receiving network device in the other network zone.

The controller may determine the risk of distribution based on consideration of a first risk factor associated with the data to be distributed and a second risk factor associated with the receiving network device/zone. The risk factor associated with the data may be provided by the sending network device; the risk factor associated with the data may be determined by the controller 1105 based on a characterization of the data provided by the sending network device; and/or the risk factor associated with the data may be determined by the controller 1105 based on analysis of the data by the controller 1105. The risk factor associated with the receiving network device may be provided by a central controller and/or an intrusion monitor at the receiving network zone. In deciding whether to block or allow a data distribution, the controller 1105 may also consider other factors such as a risk associated with the sending network device and/or the sending network zone.

The gatekeeper 1101 may thus be provided in a path of data being distributed outside a network zone. Stated in other words, one or more gatekeepers may define a boundary of a network zone with respect to data to be distributed from inside the network zone to outside the network zone. Accordingly, the gatekeeper 1101 may be used to control distribution of data out of a network zone including the gatekeeper 1101. Data flowing into the network zone may simply pass through or by the gatekeeper 1101. In an alternative, the gatekeeper 1101 may also control distribution of data from outside the network zone including the gatekeeper to within the network zone. For example, the gatekeeper 1101 may provide a firewall with respect to data from outside the network zone including the gatekeeper.

According to embodiments discussed above with respect to FIGS. 1 and 2, the gatekeeper 1101 may determine a risk of distribution based on consideration of a risk factor associated with the data and a risk factor associated with the receiving network device. If data is to be distributed to an external network such as the Internet and/or intrusion monitoring is not available or is out of service in another network zone/device, however, the gatekeeper 1101 risk information may not be available for the external network/zone/device. In the event that risk information for the receiving network/zone/device is not available, the gatekeeper 1101 may assume a risk factor to associate with the receiving network/zone/device and/or the gatekeeper 1101 may determine whether to allow or block the distribution using only the risk factor associated with the data.

Figure 3:
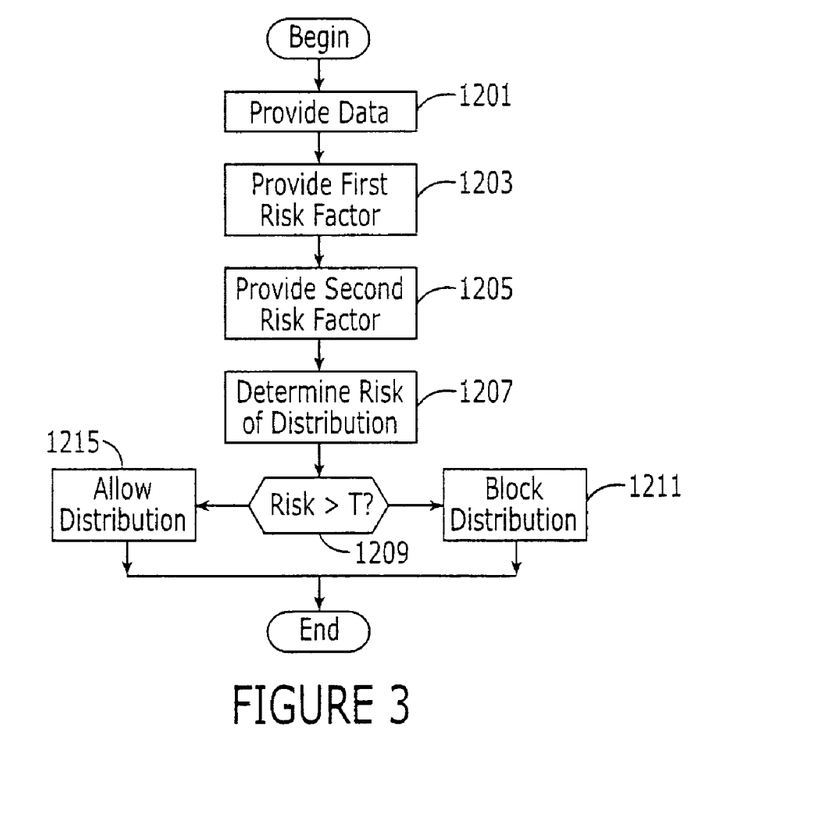
FIG. 3 is a flow chart illustrating operations of data networks according to embodiments of the present invention.

FIG. 3 is a flow chart illustrating network operations according to embodiments of the present invention. At block 1201, data may be provided for distribution from a sending network device to a receiving network device. In addition, a first risk factor associated with the data may be provided at block 1203, and a second risk factor associated with the second network device may be provided at block 1205. At block 1207, a risk of distribution may be determined based on consideration of the first and second risk factors. If the risk of distribution exceeds a threshold T at block 1209, the data may be distributed to the second network device at block 1211. Otherwise, the distribution of data may be allowed at block 1215.

As discussed above, the first risk factor provided at block 1203 may characterize a sensitivity of the data, and the second risk factor provided at block 1205 may characterize a degree of network intrusion associated with the receiving network device. Moreover, determining the risk of distribution at block 1207 may include summing the first and second risk factors, and the distribution of data may be blocked if the sum including the first and second risk factors exceeds the threshold. In an alternative, determining the risk of distribution at block 1207 may include comparing the first and second risk factors. In addition, a third risk factor associated with the first network device may, be provided, and determining the risk of distribution at block 1207 may include determining the risk of distribution based on consideration of the first, second, and third risk factors.

The first risk factor provided at block 1203 may be based on at least one of a search for keywords, input from a creator of the data, a form of the data, a setting of the data, an owner of the data, and/or a classification of the data. The second risk factor provided at block 1205 may be based on monitored network intrusions associated with the second network device.

Many variations and modifications can be made to the embodiments described herein without substantially departing from the principles of the present invention. All such variations and modifications are intended to be included herein within the scope of the present invention, as set forth in the following claims.

That which is claimed is:

1. A method of operating a data network including a first network device and a second network device, the method comprising:
   providing data for distribution from the first network device to the second network device;
   providing a first risk factor associated with the data wherein the first risk factor characterizes a sensitivity of the data with the respect to unauthorized access to the data;
   providing a second risk factor associated with the second network device wherein the second risk factor characterizes a degree of network intrusion associated with the second net work device;
   assessing a risk of distribution based on consideration of the first and second risk factors;
   blocking the distribution of data to the second network device if the risk of distribution exceeds a threshold; and
   allowing the distribution of data to the second network device if the risk of distribution does not exceed the threshold;
   wherein assessing the risk of distribution comprises summing the first and second risk factors, and wherein blocking the distribution of data comprises blocking the distribution of data if the sum including the first and second risk factors exceeds the threshold.

2. A method according to claim 1, further comprising:
   providing a third risk factor associated with the first network device;
   wherein assessing the risk of distribution comprises assessing the risk of distribution based on consideration of the first, second, and third risk factors.

3. A method according to claim 1, wherein the first risk factor associated with the data is based on at least one of a search for keywords included in the data, input from a creator of the data, a form of the data, a setting of the data, an owner of the data, and/or a classification of the data.

4. A method according to claim 1, wherein the second risk factor associated with the second network device is based on monitored network intrusions associated with the second network device.

5. A method according to claim 1, wherein the first network device is included in a first network zone comprising a first plurality of network devices, and wherein the second network device is included in a second network zone comprising a second plurality of network devices.

6. A method according to claim 5, further comprising:
   monitoring unauthorized network intrusions of the second plurality of network devices in the second network zone;
   wherein the second risk factor is based on monitoring the unauthorized network intrusions of the second plurality of network devices in the second network zone.

7. A method according to claim 5, further comprising:
   allowing a distribution of data from the first network device to another network device in the first network zone without delay.

8. A data network comprising:
   first and second network devices, with each of the first and second network devices being configured to transmit and receive data; and
   a network gatekeeper coupled between the first and second network devices, the network gatekeeper being configured to receive data from the first network device for distribution to the second network device, to assess a risk of distribution based on consideration of a first risk factor that characterizes a sensitivity of the data with respect to unauthorized access to the data and a second risk factor associated with the second network device, to block the distribution of data to the second network device if the risk of distribution exceeds a threshold, and to allow the distribution of data to the second network device if the risk of distribution does not exceed the threshold;
   wherein the second risk factor characterizes a degree of network intrusion associated with the second network device, wherein the network gatekeeper is configured to assess the risk of distribution by summing the first and second risk factors, and wherein the network gatekeeper is configured to block the distribution of data if the sum including the first and second risk factors exceeds the threshold.

9. A computer program product for operating a data network, the computer program product comprising a computer readable storage medium having computer readable program code embodied therein, the computer readable program code comprising:
   computer readable program code configured to provide data for distribution from a first network device to a second network device;
   computer readable program code configured to provide a first risk factor associated with the data wherein the first risk factor characterizes a sensitivity of the data with respect to unauthorized access to the data;
   computer readable program code configured to provide a second risk factor associated with the second network device wherein the second risk factor characterizes a degree of network intrusion associated with the second network device;
   computer readable program code configured to assess a risk of distribution based on consideration of the first and second risk factors;
   computer readable program code configured to block the distribution of data to the second network device if the risk of distribution exceeds a threshold; and
   computer readable program code configured to allow the distribution of data to the second network device if the risk of distribution does not exceed the threshold;
   wherein assessing the risk of distribution comprises summing the first and second risk factors, and wherein blocking the distribution of data comprises blocking the distribution of data if the sum including the first and second risk factors exceeds the threshold.

10. A method according to claim 6, wherein the first network zone includes a first gate keeper between the first network device and all other network devices outside the first network zone. wherein the second network zone includes a second gate keeper between the second network device and all other network devices outside the second network zone, and wherein blocking the distribution of data comprises blocking the distribution of data from the first network device at the first gate keeper in the first network zone.

11. A method according to claim 10, further comprising:
allowing a distribution of data from the first network device to another network device in the first network zone without delay and without passing through the first gate keeper.

12. A data network according to claim 8, wherein the gate keeper comprises a first gate keeper, the data network further comprising:
a first network zone comprising a first plurality of network devices wherein the first network device is included in the first network zone and wherein the first gate keeper is between the first network device and all other network devices outside the first network zone;
a second network zone comprising a second plurality of network devices wherein the second network device is included in the second network zone wherein the first gate keeper is configured to monitor unauthorized network intrusions of the second plurality of network devices in the second network zone, and wherein the second risk factor is based on monitoring the unauthorized network intrusions of the second plurality of network devices in the second network zone; and
a second gate keeper in the second network zone wherein the second gate keeper is between the second network device and all other network devices outside the second network zone;
wherein the first gate keeper is configured to block the distribution of data from the first network device at the first gate keeper in the first network zone.

13. A data network according to claim 12, wherein the first network zone is configured to allow a distribution of data from the first network device to another network device in the first network zone without delay and without passing through the first gate keeper.

* * * * *

UNITED STATES PATENT AND TRADEMARK OFFICE
CERTIFICATE OF CORRECTION

PATENT NO. : 7,549,162 B2
APPLICATION NO. : 11/005638
DATED : June 16, 2009
INVENTOR(S) : Aaron Page 1 of 1

It is certified that error appears in the above-identified patent and that said Letters Patent is hereby corrected as shown below:

In the Claims:

Column 15, Claim 1, Line 23:
Please correct "with the respect" to read -- with respect --

Column 15, Claim 1, Line 28: Please correct "net work" to read -- network --

Signed and Sealed this

Eighteenth Day of August, 2009

David J. Kappos
*Director of the United States Patent and Trademark Office*